US012716153B2

(12) United States Patent
Miyamoto et al.

(10) Patent No.: US 12,716,153 B2
(45) Date of Patent: Aug. 25, 2026

(54) MELT-BLOWN NONWOVEN FABRIC, METHOD OF PRODUCING THE SAME, LAYERED BODY, FILTER FOR FACE MASK, AND FACE MASK

(71) Applicant: KANEKA CORPORATION, Osaka (JP)

(72) Inventors: Takayuki Miyamoto, Settsu (JP); Takekazu Maeda, Settsu (JP); Masanobu Tamura, Settsu (JP); Shunsuke Otani, Settsu (JP)

(73) Assignee: KANEKA CORPORATION, Osaka (JP)

( * ) Notice: Subject to any disclaimer, the term of this patent is extended or adjusted under 35 U.S.C. 154(b) by 198 days.

(21) Appl. No.: 18/714,801

(22) PCT Filed: Dec. 2, 2022

(86) PCT No.: PCT/JP2022/044567
§ 371 (c)(1),
(2) Date: May 30, 2024

(87) PCT Pub. No.: WO2023/106230
PCT Pub. Date: Jun. 15, 2023

(65) Prior Publication Data
US 2025/0027237 A1 Jan. 23, 2025

(30) Foreign Application Priority Data
Dec. 6, 2021 (JP) ................................ 2021-197923

(51) Int. Cl.
*D04H 1/435* (2012.01)
*A62B 18/02* (2006.01)
(Continued)

(52) U.S. Cl.
CPC ............. *D04H 1/435* (2013.01); *A62B 18/02* (2013.01); *A62B 23/025* (2013.01);
(Continued)

(58) Field of Classification Search
CPC .......... D04H 1/435; D04H 1/56; A62B 18/02; A62B 23/025; B01D 39/163; B01D 39/18; B01D 2239/0622; B01D 2239/1233
See application file for complete search history.

(56) References Cited

U.S. PATENT DOCUMENTS

2009/0162276 A1* 6/2009 Martin ..................... D04H 1/56 424/9.1
2011/0124779 A1 5/2011 Whitehouse et al.
(Continued)

FOREIGN PATENT DOCUMENTS

CA 2891254 A1 * 8/2014 ............... D01F 6/92
CN 111349325 A 6/2020
(Continued)

OTHER PUBLICATIONS

International Search Report mailed on Feb. 21, 2023 in PCT/JP2022/044567 filed on Dec. 2, 2022 (2 pages).

*Primary Examiner* — Jeremy R Pierce
(74) *Attorney, Agent, or Firm* — Oblon, McClelland, Maier & Neustadt, L.L.P.

(57) ABSTRACT

The present invention provides, for example, a melt-blown nonwoven fabric with high strength, high stretchability, and high particle filtration efficiency. The present invention is, for example, a melt-blown nonwoven fabric including fibers. The fibers are formed from a resin composition that contains a poly(3-hydroxyalkanoate)-based resin. A melt mass-flow rate of the resin composition at 160° C. is 90 to 700 g/10 min, and/or a weight-average molecular weight of the resin composition is 120000 to 200000. An areal weight of the
(Continued)

melt-blown nonwoven fabric is 20 to 80 g/m$^2$. An average value of a fiber diameter of the fibers is 1.7 to 3.0 μm. A coefficient of variation of the fiber diameter of the fibers is less than or equal to 0.36.

12 Claims, 2 Drawing Sheets

(51) Int. Cl.

| | |
|---|---|
| ***A62B 23/02*** | (2006.01) |
| ***B01D 39/16*** | (2006.01) |
| ***B01D 39/18*** | (2006.01) |
| ***D04H 1/56*** | (2006.01) |

(52) U.S. Cl.

CPC ........... *B01D 39/163* (2013.01); *B01D 39/18* (2013.01); *D04H 1/56* (2013.01); *B01D 2239/0622* (2013.01); *B01D 2239/1233* (2013.01)

(56) References Cited

U.S. PATENT DOCUMENTS

| | | | | |
|---|---|---|---|---|
| 2011/0256398 | A1* | 10/2011 | Kann | D01F 6/625 428/364 |
| 2019/0003082 | A1* | 1/2019 | Kikutani | D01F 6/92 |
| 2021/0317301 | A1* | 10/2021 | Shalaby | C08L 67/04 |
| 2022/0042225 | A1* | 2/2022 | He | B01D 39/1623 |

FOREIGN PATENT DOCUMENTS

| | | | | |
|---|---|---|---|---|
| DE | 20 2020 103 075 | U1 | 10/2021 | |
| JP | 2017-222791 | A | 12/2017 | |
| WO | WO-2007117235 | A1 * | 10/2007 | B32B 5/26 |
| WO | WO 2019/142920 | A1 | 7/2019 | |

* cited by examiner

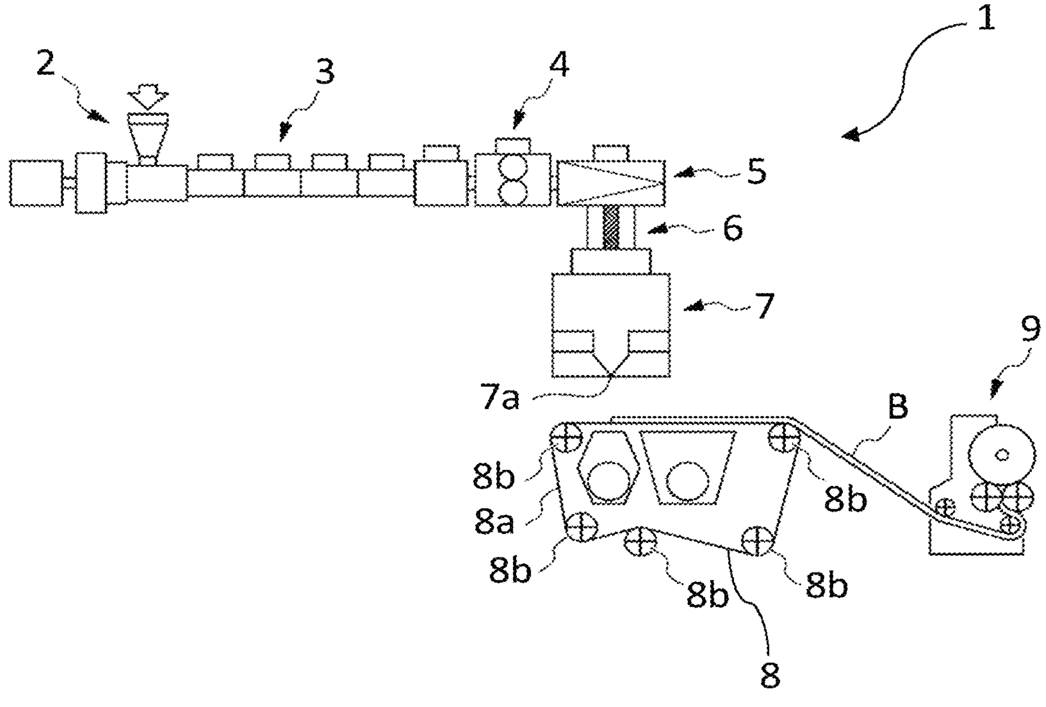
F I G. 1
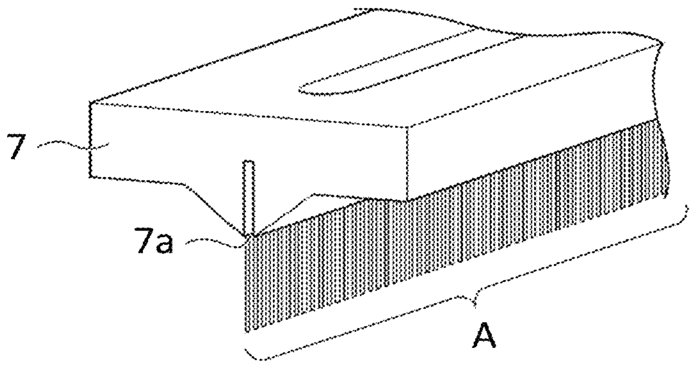
F I G. 2

MELT-BLOWN NONWOVEN FABRIC, METHOD OF PRODUCING THE SAME, LAYERED BODY, FILTER FOR FACE MASK, AND FACE MASK

CROSS-REFERENCE TO RELATED APPLICATIONS

The present application is a 35 U.S.C. § 371 national stage patent application of International patent application PCT/JP2022/044567, filed on Dec. 2, 2022, which is based on and claims the benefits of priority to Japanese Application No. 2021-197923, filed on Dec. 6, 2021. The entire contents of all of the above applications are incorporated herein by reference.

TECHNICAL FIELD

The present invention relates to a melt-blown nonwoven fabric, a method of producing the same, a layered body, a filter for a face mask, and a face mask.

BACKGROUND ART

A melt-blown nonwoven fabric is a nonwoven fabric obtained by melt-blown technique, in which a polymer and hot gas are discharged together from a spinneret. The melt-blown nonwoven fabric has a microporous structure.

For instance, the melt-blown nonwoven fabric is used as a material of, for example, a removal filter to remove particles (e.g., particles to which viruses or the like are attached, pollen, etc.) or a blood filter to filter out blood cells (the removal filter herein is a concept encompassing, for example, a filter for a face mask).

In light of reducing the load on the global environment, a fiber containing a poly(3-hydroxyalkanoate)-based resin, which is a biodegradable resin, is used as a fiber of the melt-blown nonwoven fabric (see Patent Literature 1, for example).

CITATION LIST

Patent Literature

PTL 1: WO 2019/142920

SUMMARY OF INVENTION

Technical Problem

Melt-blown nonwoven fabrics are required to have high efficiency in the filtration of particles (e.g., blood cells, pollen, particles to which viruses or the like are attached, etc.).

Therefore, in the case of a melt-blown nonwoven fabric, the nonwoven fabric is treated to be electrostatically charged by corona discharge to enhance the particle filtration efficiency.

However, a sufficient study has not been conducted on how to increase the particle filtration efficiency of a melt-blown nonwoven fabric by a technique different from the electrostatic charge treatment.

Melt-blown nonwoven fabrics are also required to have high strength and high stretchability.

In view of the above, a problem to be solved by the present invention is to provide a melt-blown nonwoven fabric with high strength, high stretchability, and high particle filtration efficiency, and to provide a method of producing the same. Another problem to be solved by the present invention is to provide: a layered body including the melt-blown nonwoven fabric; a filter for a face mask, the filter being formed from the melt-blown nonwoven fabric or from the layered body; and a face mask including the filter for a face mask.

Solution to Problem

A first aspect of the present invention relates to a melt-blown nonwoven fabric including fibers. The fibers are formed from a resin composition that contains a poly(3-hydroxyalkanoate)-based resin. A melt mass-flow rate of the resin composition at 160° C. is 90 to 700 g/10 min, and/or a weight-average molecular weight of the resin composition is 120000 to 200000. An areal weight of the melt-blown nonwoven fabric is 20 to 80 g/m$^2$. An average value of a fiber diameter of the fibers is 1.7 to 3.0 μm. A coefficient of variation of the fiber diameter of the fibers is less than or equal to 0.36.

Preferably, the poly(3-hydroxyalkanoate)-based resin includes a homopolymer and/or a copolymer, and includes 80% by mole or more of 3-hydroxybutyrate as a structural unit.

Preferably, the resin composition further contains a crystal nucleating agent in an amount of 0.1 to 2.5 parts by weight with respect to 100 parts by weight of the poly(3-hydroxyalkanoate)-based resin.

Preferably, a thickness of the melt-blown nonwoven fabric is 0.18 to 0.33 mm.

A second aspect of the present invention relates to a layered body including: a first nonwoven fabric; and a second nonwoven fabric layered over at least one surface of the first nonwoven fabric. The first nonwoven fabric is the above-described melt-blown nonwoven fabric, and the second nonwoven fabric is a nonwoven fabric including cellulosic fibers.

A third aspect of the present invention relates to a filter for a face mask, the filter being formed from the above-described melt-blown nonwoven fabric or from the above-described layered body.

A fourth aspect of the present invention relates to a face mask including: a mask body; and the above-described filter for a face mask.

A fifth aspect of the present invention relates to a method of producing a melt-blown nonwoven fabric from a raw material composition that contains a poly(3-hydroxyalkanoate)-based resin, the method including: (A) obtaining a molten product by heat-melting the raw material composition; and (B) obtaining the melt-blown nonwoven fabric from the molten product. A melt mass-flow rate of the raw material composition at 160° C. is 90 to 700 g/10 min, and/or a weight-average molecular weight of the raw material composition is 120000 to 200000.

Preferably, the raw material composition further contains a crystal nucleating agent in an amount of 0.1 to 2.5 parts by weight with respect to 100 parts by weight of the poly(3-hydroxyalkanoate)-based resin.

Preferably, the step (B) includes: discharging the molten product from a nozzle in a fibrous form; and applying gas to the fibrous molten product at 5000 to 12000 NL/min/m.

Advantageous Effects of Invention

The present invention makes it possible to provide a melt-blown nonwoven fabric with high strength, high stretchability, and high particle filtration efficiency, and to provide a method of producing the same. The present invention also makes it possible to provide: a layered body including the melt-blown nonwoven fabric; a filter for a face mask, the filter being formed from the melt-blown nonwoven fabric or from the layered body; and a face mask including the filter for a face mask.

The present invention also makes it possible to provide a melt-blown nonwoven fabric with sufficiently high particle filtration efficiency without electrostatic charge treatment.

BRIEF DESCRIPTION OF DRAWINGS

FIG. 1 is a schematic diagram showing a melt-blown nonwoven fabric producing apparatus.

FIG. 2 is a schematic perspective view of a nozzle.

DESCRIPTION OF EMBODIMENTS

Figure 3:
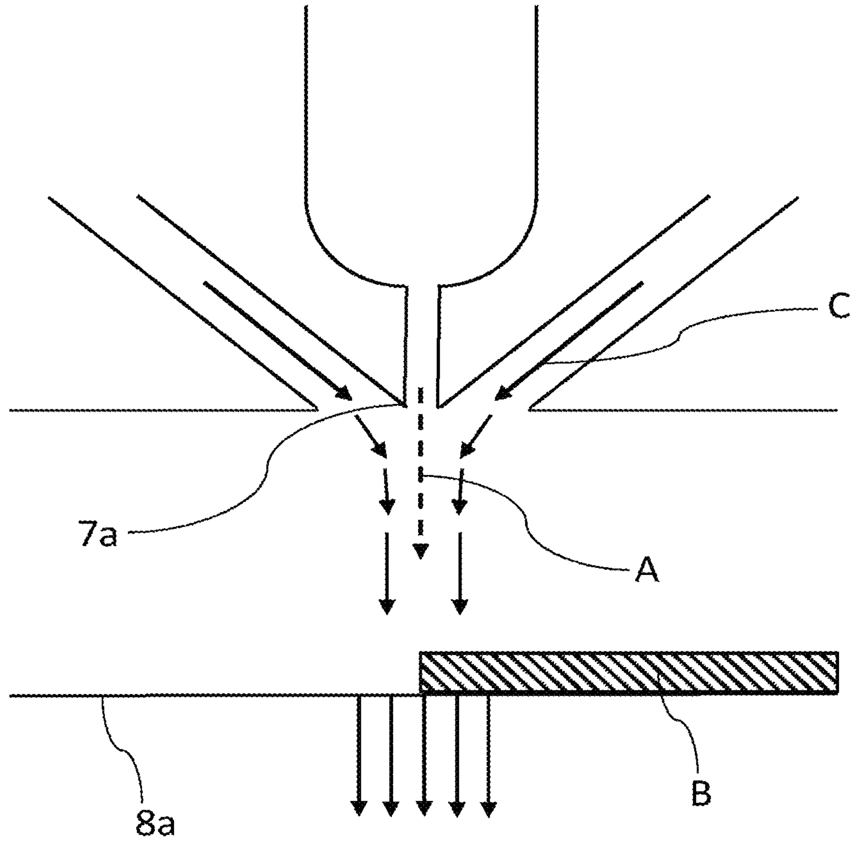
FIG. 3 is a schematic sectional view of a nozzle hole and a conveyor belt.

Hereinafter, embodiments of the present invention are described with reference to the accompanying drawings.

<Melt-Blown Nonwoven Fabric>

First, a melt-blown nonwoven fabric according to the present embodiment (a first embodiment) is described.

The melt-blown nonwoven fabric according to the present embodiment includes fibers.

The fibers are formed from a resin composition containing a poly(3-hydroxyalkanoate)-based resin.

The melt mass-flow rate (MFR) of the resin composition at 160° C. is 90 to 700 g/10 min, and/or the weight-average molecular weight of the resin composition is 120000 to 200000.

The areal weight of the melt-blown nonwoven fabric is 20 to 80 g/m$^2$.

The average value of the fiber diameter of the fibers is 1.7 to 3.0 μm.

The coefficient of variation of the fiber diameter of the fibers is less than or equal to 0.36.

The melt-blown nonwoven fabric according to the present embodiment is a nonwoven fabric obtained by melt-blown technique.

As a result of the average value of the fiber diameter of the fibers being less than or equal to 3.0 μm, the particle filtration efficiency of the melt-blown nonwoven fabric is increased.

As a result of the average value of the fiber diameter of the fibers being greater than or equal to 1.7 μm, the strength and stretchability of the melt-blown nonwoven fabric are increased.

As a result of the coefficient of variation of the fiber diameter of the fibers being less than or equal to 0.36, excessively thick fibers are reduced in the melt-blown nonwoven fabric, and consequently, the particle filtration efficiency of the melt-blown nonwoven fabric is increased. Also, as a result of the coefficient of variation of the fiber diameter of the fibers being less than or equal to 0.36, excessively thin fibers are reduced in the melt-blown nonwoven fabric, and consequently, the strength and stretchability of the melt-blown nonwoven fabric are increased.

As a result of the areal weight of the melt-blown nonwoven fabric being greater than or equal to 20 g/m$^2$, the strength and stretchability of the melt-blown nonwoven fabric are increased as well as the particle filtration efficiency of the melt-blown nonwoven fabric is increased.

As a result of the melt mass-flow rate of the resin composition in the fibers at 160° C. being less than or equal to 700 g/10 min, or as a result of the weight-average molecular weight of the resin composition in the fibers being greater than or equal to 120000, the strength and stretchability of the melt-blown nonwoven fabric are increased.

As a result of the melt mass-flow rate of the resin composition in the fibers at 160° C. being greater than or equal to 90 g/10 min, or as a result of the weight-average molecular weight of the resin composition in the fibers being less than or equal to 200000, the viscosity of a molten product during the fabrication of the melt-blown nonwoven fabric can be readily increased. This makes it possible to readily draw the molten product and to readily reduce the fiber diameter of the fibers in the obtained melt-blown nonwoven fabric. Consequently, the particle filtration efficiency of the melt-blown nonwoven fabric can be readily increased.

Therefore, the present embodiment makes it possible to provide a melt-blown nonwoven fabric with high strength, high stretchability, and high particle filtration efficiency.

The present embodiment also makes it possible to provide a melt-blown nonwoven fabric with sufficiently high particle filtration efficiency without electrostatic charge treatment.

Preferably, the melt-blown nonwoven fabric according to the present embodiment is not treated to be electrostatically charged, because, in this case, the labor hour for the electrostatic charge treatment can be eliminated while increasing the particle filtration efficiency.

Alternatively, the melt-blown nonwoven fabric according to the present embodiment may be treated to be electrostatically charged.

Since the stretchability of the melt-blown nonwoven fabric is increased according to the present embodiment, it does not easily get cracked or break. Consequently, the melt-blown nonwoven fabric according to the present embodiment is excellent in terms of processability.

Since the melt-blown nonwoven fabric according to the present embodiment has high stretchability, in the case of using the melt-blown nonwoven fabric as a filter for a face mask, the face mask has high durability against, for example, folding.

The resin composition contains a polymer component. The resin composition may further contain an additive.

The polymer component contains a poly(3-hydroxyalkanoate)-based resin.

The polymer component may contain another polymer in addition to the poly(3-hydroxyalkanoate)-based resin.

The poly(3-hydroxyalkanoate)-based resin is a polyester containing a 3-hydroxyalkanoic acid as a monomer.

Specifically; the poly(3-hydroxyalkanoate)-based resin is a resin including the 3-hydroxyalkanoic acid as a structural unit.

The poly(3-hydroxyalkanoate)-based resin is a biodegradable polymer.

It should be noted that being "biodegradable" in the present embodiment means being able to be decomposed into low molecular weight compounds by microorganisms in a natural environment. Being biodegradable or not can be determined based on tests suited for different environments. Specifically, for example, ISO 14855 (compost) and ISO 14851 (activated sludge) are suited for an aerobic condition, and ISO 14853 (aqueous phase) and ISO 15985 (solid phase) are suited for an anaerobic condition. Also, biodegradability by microorganisms in seawater can be evaluated by biochemical oxygen demand measurement.

The poly(3-hydroxyalkanoate)-based resin includes a homopolymer and/or a copolymer.

Preferably, the poly(3-hydroxyalkanoate)-based resin includes a structural unit expressed by an equation (1) shown below.

$$[\text{—CHR—CH}_2\text{—CO—O—}] \quad (1)$$

(In the above equation (1), R is an alkyl group represented by $C_pH_{2p+1}$, and p is an integer within the range of 1 to 15.)

Preferably, the poly(3-hydroxyalkanoate)-based resin includes a poly(3-hydroxybutyrate)-based resin.

It should be noted that the poly(3-hydroxybutyrate)-based resin is a resin including 3-hydroxybutyrate as a structural unit. The poly(3-hydroxybutyrate)-based resin may be a homopolymer, or may be a copolymer.

Examples of the poly(3-hydroxyalkanoate)-based resin including 3-hydroxybutyrate as a structural unit include P3HB, P3HB3HH, P3HB3HV, P3HB4HB, poly(3-hydroxybutyrate-co-3-hydroxyoctanoate), and poly(3-hydroxybutyrate-co-3-hydroxyoctadecanoate).

P3HB herein means poly(3-hydroxybutyrate), which is a homopolymer.

P3HB3HH herein means poly(3-hydroxybutyrate-co-3-hydroxyhexanoate).

P3HB3HV herein means poly(3-hydroxybutyrate-co-3-hydroxyvalerate).

P3HB4HB herein means poly(3-hydroxybutyrate-co-4-hydroxybutyrate).

It should be noted that P3HB has a function to facilitate crystallization of P3HB itself and crystallization of the poly(3-hydroxyalkanoate)-based resin other than P3HB. Accordingly, preferably, the poly(3-hydroxyalkanoate)-based resin includes P3HB.

In order to achieve both excellent biodegradability and excellent molding processability, the poly(3-hydroxyalkanoate)-based resin is preferably, but not particularly limited to, P3HB, P3HB3HH, P3HB3HV, or P3HB4HB.

Preferably, the poly(3-hydroxyalkanoate)-based resin is P3HB3HH.

The poly(3-hydroxyalkanoate)-based resin preferably includes 80% by mole or more of 3-hydroxybutyrate, or more preferably includes 85% by mole or more of 3-hydroxybutyrate, as a structural unit.

As a result of the poly(3-hydroxyalkanoate)-based resin including 80% by mole or more of 3-hydroxybutyrate as a structural unit, the stiffness of the fibers is increased.

Also, the poly(3-hydroxyalkanoate)-based resin preferably includes 99% by mole or less of 3-hydroxybutyrate, or more preferably includes 97% by mole or less of 3-hydroxybutyrate, as a structural unit.

As a result of the poly(3-hydroxyalkanoate)-based resin including 99% by mole or less of 3-hydroxybutyrate as a structural unit, the fibers have excellent flexibility.

The polymer component may include only one kind of the poly(3-hydroxyalkanoate)-based resin, or may include two or more kinds of the poly(3-hydroxyalkanoate)-based resins.

In a case where the poly(3-hydroxyalkanoate)-based resin includes a copolymer (e.g., P3HB3HH), the poly(3-hydroxyalkanoate)-based resin may include two or more kinds of copolymers having different average composition ratios of the structural unit.

The resin composition preferably contains 50% by mass or more of the poly(3-hydroxyalkanoate)-based resin, more preferably contains 80% by mass or more thereof, and even more preferably contains 90% by mass or more thereof.

The aforementioned another polymer is preferably biodegradable.

Examples of this other polymer that is biodegradable include polycaprolactone, polylactic acid, polybutylene succinate, polybutylene succinate adipate, polybutylene adipate terephthalate, polyethylene succinate, polyvinyl alcohol, polyglycolic acid, unmodified starch, modified starch, cellulose acetate, and chitosan.

The polycaprolactone is a polymer obtained by ring-opening polymerization of ε-caprolactone.

The resin composition may include one kind of this other polymer, or two or more kinds of these other polymers.

Thus, the melt-blown nonwoven fabric according to the present embodiment includes the biodegradable polymer(s). Therefore, even if the melt-blown nonwoven fabric is discarded in an environment, since the melt-blown nonwoven fabric is readily decomposed in the environment, the load on the environment can be reduced.

The resin composition may further contain an additive.

Examples of the additive include a crystal nucleating agent, a lubricant, a stabilizer (such as an antioxidant or ultraviolet absorber), a colorant (such as a dye or pigment), a plasticizer, an inorganic filler, an organic filler, and an antistatic agent.

Preferably, the resin composition contains a crystal nucleating agent as the additive.

The crystal nucleating agent is a compound that facilitates crystallization of the poly(3-hydroxyalkanoate)-based resin. The crystal nucleating agent has a melting point higher than that of the poly(3-hydroxyalkanoate)-based resin.

Since the resin composition contains the crystal nucleating agent, at the time of fabrication of the melt-blown nonwoven fabric by melt-blown technique, crystallization of the poly(3-hydroxyalkanoate)-based resin is facilitated, and the fibers that are adjacent to each other are not easily fused to each other. This consequently makes it possible to readily reduce the coefficient of variation of the fiber diameter of the fibers.

Examples of the crystal nucleating agent include: inorganic substances (e.g., boron nitride, titanium oxide, talc, layered silicate, calcium carbonate, sodium chloride, metal phosphate, etc.); sugar alcohol compounds derived from natural products (e.g., pentaerythritol, erythritol, galactitol, mannitol, arabitol, etc.); polyvinyl alcohol; chitin; chitosan; polyethylene oxides; aliphatic carboxylates; aliphatic alcohols; aliphatic carboxylic acid esters; dicarboxylic acid derivatives (e.g., dimethyl adipate, dibutyl adipate, di-isodecyl adipate, dibutyl sebacate, etc.); cyclic compounds having, in their molecule, C=O and a functional group selected from the group consisting of NH, S, and O (e.g., indigo, quinacridone, quinacridone magenta, etc.); sorbitol derivatives (e.g., bis-benzylidene sorbitol, bis(p-methylbenzylidene)sorbitol, etc.); compounds containing a nitrogen-containing heteroaromatic nucleus (e.g., pyridine ring, triazine ring, imidazole ring, etc.) (e.g., pyridine, triazine, imidazole, etc.); phosphate ester compounds; bisamides of higher fatty acids; metal salts of higher fatty acids; and branched polylactic acid.

It should be noted that P3HB, which is the poly(3-hydroxyalkanoate)-based resin, can be used as the crystal nucleating agent.

One of these crystal nucleating agents may be used alone, or two or more of these crystal nucleating agents may be used in combination.

As the crystal nucleating agent, sugar alcohol compounds, polyvinyl alcohol, chitin, and chitosan are preferable in light of the effect of improving the crystallization rate of the poly(3-hydroxyalkanoate)-based resin as well as in light of compatibility and affinity with the poly(3-hydroxyalkanoate)-based resin.

Among the sugar alcohol compounds, pentaerythritol is preferable.

The crystal nucleating agent preferably has a crystal structure at normal temperature (25° C.). Since the crystal nucleating agent has a crystal structure at normal temperature (25° C.), the crystallization of the poly(3-hydroxyalkanoate)-based resin is further facilitated, which is advantageous.

The crystal nucleating agent that has a crystal structure at normal temperature (25° C.) is preferably powdery at normal temperature (25° C.).

The crystal nucleating agent that is powdery at normal temperature (25° C.) preferably has a mean particle diameter of 10 μm or less.

The resin composition contains the crystal nucleating agent in an amount of preferably 0.1 parts by mass or more, more preferably 0.3 parts by mass or more, and even more preferably 0.5 parts by mass or more, with respect to 100 parts by mass of the poly(3-hydroxyalkanoate)-based resin.

Since the resin composition contains the crystal nucleating agent in an amount of 0.1 parts by mass or more with respect to 100 parts by mass of the poly(3-hydroxyalkanoate)-based resin, at the time of fabrication of the melt-blown nonwoven fabric by melt-blown technique, the crystallization of the poly(3-hydroxyalkanoate)-based resin is even further facilitated, which is advantageous.

Also, the resin composition contains the crystal nucleating agent in an amount of preferably 2.5 parts by mass or less, more preferably 0.3 parts by mass or more, and even more preferably 0.5 parts by mass or more, with respect to 100 parts by mass of the poly(3-hydroxyalkanoate)-based resin.

Since the resin composition contains the crystal nucleating agent in an amount of 2.5 parts by mass or less with respect to 100 parts by mass of the poly(3-hydroxyalkanoate)-based resin, at the time of fabrication of the melt-blown nonwoven fabric by melt-blown technique, the fibers can be readily obtained, which is advantageous.

It should be noted that P3HB is the poly(3-hydroxyalkanoate)-based resin, and can also function as the crystal nucleating agent. Therefore, in a case where the resin composition contains P3HB, the amount of the P3HB is included in both the amount of the poly(3-hydroxyalkanoate)-based resin and the amount of the crystal nucleating agent.

The resin composition preferably contains the lubricant. As a result of the lubricant being included in the fibers, the slipperiness of the fibers at the time of fabrication of the melt-blown nonwoven fabric by melt-blown technique is improved, which makes it possible to suppress the fibers from being fused to each other.

The lubricant is, for example, a compound having an amide bond.

The compound having an amide bond preferably includes at least one selected from the group consisting of lauric acid amide, myristic acid amide, stearic acid amide, behenic acid amide, and erucic acid amide.

The resin composition contains the lubricant in an amount of preferably 0.05 parts by mass or more, more preferably 0.1 parts by mass or more, and even more preferably 0.5 parts by mass or more, with respect to 100 parts by mass of the polymer component. Since the resin composition contains the lubricant in an amount of 0.05 parts by mass or more with respect to 100 parts by mass of the polymer component, at the time of fabrication of the melt-blown nonwoven fabric by melt-blown technique, the fibers can be further suppressed from being fused to each other, which is advantageous.

Also, the resin composition contains the lubricant in an amount of preferably 12 parts by mass or less, more preferably 10 parts by mass or less, even more preferably 8 parts by mass or less, and most preferably 5 parts by mass or less, with respect to 100 parts by mass of the polymer component. Since the resin composition contains the lubricant in an amount of 12 parts by mass or less with respect to 100 parts by mass of the polymer component, the lubricant can be suppressed from bleeding out on the surface of the fibers, which is advantageous.

In the melt-blown nonwoven fabric according to the present embodiment, the melt mass-flow rate (MFR) of the resin composition at 160° C. is 90 to 700 g/10 min, and/or the weight-average molecular weight of the resin composition is 120000 to 200000.

As a result of the melt mass-flow rate of the resin composition in the fibers at 160° C. being less than or equal to 700 g/10 min, or as a result of the weight-average molecular weight of the resin composition in the fibers being greater than or equal to 120000, the strength and stretchability of the melt-blown nonwoven fabric are increased.

As a result of the melt mass-flow rate of the resin composition in the fibers at 160° C. being greater than or equal to 90 g/10 min, or as a result of the weight-average molecular weight of the resin composition in the fibers being less than or equal to 200000, the viscosity of a molten product during the fabrication of the melt-blown nonwoven fabric can be readily increased. This makes it possible to readily draw the molten product and to readily reduce the fiber diameter of the fibers in the obtained melt-blown nonwoven fabric. Consequently, the particle filtration efficiency of the melt-blown nonwoven fabric can be readily increased.

The melt mass-flow rate (MFR) of the resin composition at 160° C. is preferably 100 to 700 g/10 min, and more preferably 200 to 650 g/10 min.

It should be noted that the melt mass-flow rate (MFR) of the resin composition at 160° C. is determined in the following manner: determining the melt volume-flow rate (MVR) of the resin composition at 160° C. in accordance with the method B of ASTM-D1238 (ISO1133-1, JIS K7210-1:2011); and then determining the melt mass-flow rate (MFR) of the resin composition at 160° C. from the determined melt volume-flow rate (MVR) of the resin composition at 160° C. and the density of the resin composition.

Here, the melt volume-flow rate (MVR) of the resin composition at 160° C. is measured in the following manner: heating 5 g or more of the resin composition at 160° C. for four minutes; and then measuring the melt volume-flow rate (MVR) of the resin composition while applying a load of 5 kg onto the heated resin composition.

The weight-average molecular weight of the resin composition is preferably 130000 to 190000.

It should be noted that the weight-average molecular weight in the present embodiment is measured based on a molecular weight distribution in terms of polystyrene by using gel permeation chromatography (GPC) using a chloroform eluent. A column used in the GPC may be any column suitable for measuring the molecular weight.

The average value of the fiber diameter of the fibers is 1.7 to 3.0 μm, and is preferably 2.0 to 2.9 μm.

The coefficient of variation of the fiber diameter of the fibers is less than or equal to 0.36, and is preferably less than or equal to 0.35. Also, the coefficient of variation of the fiber diameter of the fibers is, for example, greater than or equal to 0.10.

As a result of the average value of the fiber diameter of the fibers being less than or equal to 3.0 μm, the particle filtration efficiency of the melt-blown nonwoven fabric is increased.

As a result of the average value of the fiber diameter of the fibers being greater than or equal to 1.7 μm, the strength and stretchability of the melt-blown nonwoven fabric are increased.

As a result of the coefficient of variation of the fiber diameter of the fibers being less than or equal to 0.36, excessively thick fibers are reduced in the melt-blown nonwoven fabric, and consequently, the particle filtration efficiency of the melt-blown nonwoven fabric is increased. Also, as a result of the coefficient of variation of the fiber diameter of the fibers being less than or equal to 0.36, excessively thin fibers are reduced in the melt-blown nonwoven fabric, and consequently, the strength and stretchability of the melt-blown nonwoven fabric are increased.

It should be noted that the average value and the coefficient of variation of the fiber diameter of the fibers can be determined in a manner described below.

First, a test piece is obtained from the melt-blown nonwoven fabric.

Next, photographs (magnification: 1700×) of the surface of the test piece at five different locations on the surface of the test piece are taken by a scanning electron microscope.

Then, 20 or more fibers are randomly selected in each photograph, and the diameter (width) of each of the selected fibers is measured.

Next, based on the measured diameter (width) values of all the selected fibers, an arithmetic average value and a coefficient of variation (=standard deviation/arithmetic average value) are determined.

The areal weight of the melt-blown nonwoven fabric according to the present embodiment is 20 to 80 g/m$^2$, preferably 25 to 77 g/m$^2$, and more preferably 30 to 75 g/m$^2$.

As a result of the areal weight of the melt-blown nonwoven fabric according to the present embodiment being greater than or equal to 20 g/m$^2$, the strength and stretchability of the melt-blown nonwoven fabric are increased as well as the particle filtration efficiency of the melt-blown nonwoven fabric is increased.

Also, as a result of the areal weight of the melt-blown nonwoven fabric according to the present embodiment being less than or equal to 80 g/m$^2$, the solution permeability (e.g., water permeability) or air permeability of the melt-blown nonwoven fabric can be increased.

It should be noted that the areal weight of the melt-blown nonwoven fabric according to the present embodiment can be determined in a manner described below.

First, a test piece is obtained from the melt-blown nonwoven fabric according to the present embodiment.

The size of the test piece may be, for example, 100 mm×100 mm or 200 mm×200 mm.

Next, the weight of the test piece is measured by an electronic balance or the like.

Then, the measured weight of the test piece is divided by the area of the test piece to calculate the areal weight.

The thickness of the melt-blown nonwoven fabric according to the present embodiment is preferably 0.10 to 0.40 mm, and more preferably 0.18 to 0.33 mm.

As a result of the thickness of the melt-blown nonwoven fabric according to the present embodiment being 0.10 to 0.40 mm, the melt-blown nonwoven fabric having uniform quality can be readily obtained at the time of fabrication of the melt-blown nonwoven fabric.

Also, as a result of the thickness of the melt-blown nonwoven fabric according to the present embodiment being greater than or equal to 0.10 mm, the strength and stretchability of the melt-blown nonwoven fabric are increased as well as the particle filtration efficiency of the melt-blown nonwoven fabric is increased.

Further, as a result of the thickness of the melt-blown nonwoven fabric according to the present embodiment being less than or equal to 0.40 mm, the solution permeability (e.g., water permeability) or air permeability of the melt-blown nonwoven fabric can be increased.

It should be noted that the thickness of the melt-blown nonwoven fabric according to the present embodiment can be determined in the following manner: measuring the thickness of the melt-blown nonwoven fabric at three or more locations thereon by a thickness gauge; and then determining the arithmetic average value thereof as the thickness of the melt-blown nonwoven fabric.

The thickness gauge used herein is, for example, "PEACOCK" available from OZAKI MFG. CO., LTD.

The melt-blown nonwoven fabric according to the present embodiment has an average pore diameter of preferably greater than or equal to 2.5 μm and less than or equal to 10.0 μm, and more preferably greater than or equal to 3.0 μm and less than or equal to 7.0 μm.

As a result of the average pore diameter of the melt-blown nonwoven fabric according to the present embodiment being greater than or equal to 2.5 μm, the solution permeability (e.g., water permeability) or air permeability of the melt-blown nonwoven fabric can be increased.

As a result of the average pore diameter of the melt-blown nonwoven fabric according to the present embodiment being less than or equal to 7.0 μm, the particle filtration efficiency of the melt-blown nonwoven fabric is increased.

The average pore diameter of the melt-blown nonwoven fabric according to the present embodiment is a mean flow pore diameter determined in accordance with JIS K3832-1990 "Testing methods for bubble point of membrane filters".

The mean flow pore diameter can be measured by using, for example, Perm-Porometer (available from Porous Materials, Inc.).

The tensile strength of the melt-blown nonwoven fabric according to the present embodiment in the MD direction is preferably greater than or equal to 2.0 N/m$^2$ and less than or equal to 15.0 N/m$^2$, and more preferably greater than or equal to 3.0 N/m$^2$ and less than or equal to 10.0 N/m$^2$.

Also, the tensile strength of the melt-blown nonwoven fabric according to the present embodiment in the CD direction is preferably greater than or equal to 2.0 N/m$^2$ and less than or equal to 8.0 N/m$^2$, and more preferably greater than or equal to 2.5 N/m$^2$ and less than or equal to 6.0 N/m$^2$.

The MD direction herein means the direction (Machine Direction) in which the melt-blown nonwoven fabric moves during the production of the melt-blown nonwoven fabric.

The CD direction herein means the direction perpendicular to the MD direction.

It should be noted that the tensile strength can be measured by using a constant rate extension type tensile test machine that accords with JIS B7721:2018 "Tension/compression testing machines-Calibration and verification of the force-measuring system". It should be noted that the constant rate extension type tensile test machine used herein may be, for example, a universal tester (RTG-1210 available from A&D Company, Limited).

Specifically, the tensile strength can be determined in a manner described below.

First, a test piece is (width: 8 mm, length: 40 mm) is cut out from the melt-blown nonwoven fabric.

Next, the test piece with an initial load applied thereto is attached to the tensile test machine, i.e., gripped by grips of the tensile test machine, with the length of the test piece between the grips being 20 mm.

Here, the initial load is applied to the test piece by pulling the test piece by hand to such an extent that sagging does not occur.

Then, a load is applied to the test piece at a tensile speed of 20 mm/min until the test piece breaks.

Next, the tensile strength is determined based on an equation shown below.

Tensile strength=the load at break/the cross-sectional area of the test piece

The cross-sectional area of the test piece is the product of the width (8 mm) of the test piece and the thickness of the test piece.

The melt-blown nonwoven fabric according to the present embodiment is suitably usable as, for example, a material of a filter.

Examples of the filter include a removal filter to remove particles (e.g., particles to which viruses or the like are attached, pollen, coffee grounds, etc.) and a blood filter to filter out blood cells (the removal filter is, for example, a filter for a face mask, or a coffee filter).

Two or more pieces of the melt-blown nonwoven fabric according to the present embodiment may be layered together, which may be used as, for example, a material of the filter.

<Layered Body>

A layered body according to the present embodiment includes: a first nonwoven fabric; and a second nonwoven fabric layered over at least one surface of the first nonwoven fabric.

The first nonwoven fabric is the melt-blown nonwoven fabric according to the present embodiment.

The second nonwoven fabric includes cellulosic fibers.

Examples of the cellulosic fibers include cotton fibers, rayon (a concept encompassing cupra (which is also referred to as "copper ammonia rayon")) fibers, and acetate fibers.

As a result of including the first nonwoven fabric, the layered body has increased particle filtration efficiency, and as a result of further including the second nonwoven fabric, the layered body has increased strength.

Examples of the second nonwoven fabric include a spun-lace nonwoven fabric.

<Filter for Face Mask>

A filter for a face mask according to the present embodiment is formed from the melt-blown nonwoven fabric according to the present embodiment, or formed from the layered body according to the present embodiment.

<Face Mask>

A face mask according to the present embodiment may include: a mask body; and the filter for a face mask according to the present embodiment.

The mask body includes: a pair of ear loops; and a holder that holds the filter for a face mask.

The face mask according to the present embodiment may be configured such that the filter for a face mask is attachable to and detachable from the holder.

Alternatively, the face mask according to the present embodiment may be configured such that the mask body and the filter for a face mask are integrated together.

Further, the face mask according to the present embodiment may be a disposable face mask.

The face mask according to the present embodiment may have a layered structure including two or more layers in which the melt-blown nonwoven fabric according to the present embodiment and a base material sheet are layered together.

Specifically, the face mask according to the present embodiment may have a three-layer structure in which a piece of the base material sheet, the melt-blown nonwoven fabric according to the present embodiment, and another piece of the base material sheet are layered together in this order.

The base material sheet includes fibers.

The base material sheet is, for example, a nonwoven fabric or a woven fabric.

Examples of the fibers in the base material sheet include cellulosic fibers, polypropylene-based fibers (PP-based fibers), polyethylene terephthalate-based fibers (PET-based fibers), and polybutylene terephthalate-based fibers (PBT-based fibers).

Examples of the cellulosic fibers as the fibers in the base material sheet include cotton fibers, rayon (a concept encompassing cupra (which is also referred to as "copper ammonia rayon")) fibers, and acetate fibers.

The fibers in the base material sheet may be filament fibers, or may be staple fibers.

The nonwoven fabric as the base material sheet is, for example, a spun-bond nonwoven fabric or a spun-lace nonwoven fabric.

The woven fabric as the base material sheet is, for example, gauze. Gauze includes cotton fibers.

The nonwoven fabric as the base material sheet including the cellulosic fibers is, for example, a nonwoven fabric produced by wet staple fiber spun-bond technique.

The nonwoven fabric produced by wet staple fiber spun-bond technique is, for example, a nonwoven fabric of TCF (registered trademark) series (available from FUTAMURA CHEMICAL CO., LTD.). The nonwoven fabric of TCF (registered trademark) series is a nonwoven fabric produced by TCF (registered trademark) technique.

The fibers included in the spun-lace nonwoven fabric are, for example, cellulosic fibers, specifically, rayon fibers.

The fibers included in the spun-bond nonwoven fabric are, for example, polypropylene-based fibers (PP-based fibers), polyethylene terephthalate-based fibers (PET-based fibers), or polybutylene terephthalate-based fibers (PBT-based fibers).

For example, the face mask according to the present embodiment has a three-layer structure in which a piece of the spun-bond nonwoven fabric, the melt-blown nonwoven fabric according to the present embodiment, and another piece of the spun-bond nonwoven fabric are layered together in this order. That is, the face mask according to the present embodiment has, as one example, a SMS three-layer structure. In other words, the face mask may be a SMS face mask.

The face mask according to the present embodiment may include the second nonwoven fabric and/or a woven fabric.

The face mask according to the present embodiment may have a three-layer structure in which a piece of the second nonwoven fabric or the woven fabric, the melt-blown nonwoven fabric according to the present embodiment, and another piece of the second nonwoven fabric or the woven fabric are layered together in this order.

In other words, in the face mask according to the present embodiment, the second nonwoven fabric and/or the woven fabric may be used instead of the spun-bond nonwoven fabric in the SMS face mask.

<Method of Producing Melt-Blown Nonwoven Fabric>

A method of producing a melt-blown nonwoven fabric according to the present embodiment is a production method in which the melt-blown nonwoven fabric is obtained from a raw material composition containing a poly(3-hydroxyalkanoate)-based resin by melt-blown technique.

The method of producing a melt-blown nonwoven fabric according to the present embodiment includes: a step (A) of obtaining a molten product by heat-melting the raw material composition; and a step (B) of obtaining the melt-blown nonwoven fabric from the molten product.

The melt mass-flow rate of the raw material composition at 160° C. is 90 to 700 g/10 min, and/or the weight-average molecular weight of the raw material composition is 120000 to 200000.

As a result of the melt mass-flow rate of the raw material composition at 160° C. being less than or equal to 700 g/10 min, or as a result of the weight-average molecular weight of the raw material composition being greater than or equal to 120000, the strength and stretchability of the melt-blown nonwoven fabric are further increased.

As a result of the melt mass-flow rate of the raw material composition at 160° C. being greater than or equal to 90 g/10 min, or as a result of the weight-average molecular weight of the raw material composition being less than or equal to 200000, the viscosity of the molten product during the fabrication of the melt-blown nonwoven fabric can be readily increased. This makes it possible to readily draw the molten product and to readily reduce the fiber diameter of the fibers in the obtained melt-blown nonwoven fabric. Consequently, the particle filtration efficiency of the melt-blown nonwoven fabric is further increased.

The melt mass-flow rate (MFR) of the raw material composition at 160° C. is preferably 100 to 650 g/10 min.

It should be noted that the melt mass-flow rate (MFR) of the raw material composition at 160° C. is determined in the following manner: determining the melt volume-flow rate (MVR) of the raw material composition at 160° C. in accordance with the method B of ASTM-D1238 (ISO1133-1, JIS K7210-1:2011); and then determining the melt mass-flow rate (MFR) of the raw material composition at 160° C. from the determined melt volume-flow rate (MVR) of the raw material composition at 160° C. and the density of the raw material composition.

Here, the melt volume-flow rate (MVR) of the raw material composition at 160° C. is measured in the following manner: heating 5 g or more of the raw material composition at 160° C. for four minutes; and then measuring the melt volume-flow rate (MVR) of the raw material composition while applying a load of 5 kg onto the heated resin composition.

The weight-average molecular weight of the raw material composition is preferably 130000 to 190000.

In the method of producing a melt-blown nonwoven fabric according to the present embodiment, a melt-blown nonwoven fabric producing apparatus is used to obtain the melt-blown nonwoven fabric from the raw material composition.

Hereinafter, the melt-blown nonwoven fabric obtained from the production method (the melt-blown nonwoven fabric according to a second embodiment) is described.

It should be noted that the descriptions already given for the melt-blown nonwoven fabric according to the present embodiment (i.e., the melt-blown nonwoven fabric according to the first embodiment) are omitted below; and unless additional descriptions are particularly given in the second embodiment, it is assumed that the same descriptions as those given in the first embodiment apply to the second embodiment.

The areal weight of the melt-blown nonwoven fabric according to the second embodiment is preferably 20 to 80 $g/m^2$, more preferably 25 to 77 $g/m^2$, and yet more preferably 30 to 75 $g/m^2$.

The average value of the fiber diameter of the fibers in the melt-blown nonwoven fabric according to the second embodiment is preferably 1.7 to 3.0 μm, and more preferably 2.0 to 2.9 μm.

The coefficient of variation of the fiber diameter of the fibers in the melt-blown nonwoven fabric according to the second embodiment is preferably less than or equal to 0.36, and more preferably less than or equal to 0.35. Also, the coefficient of variation of the fiber diameter of the fibers is, for example, greater than or equal to 0.10.

The melt mass-flow rate of the resin composition in the melt-blown nonwoven fabric according to the second embodiment at 160° C. is preferably 90 to 700 g/10 min, more preferably 100 to 700 g/10 min, and even more preferably 200 to 650 g/10 min.

The weight-average molecular weight of the resin composition in the melt-blown nonwoven fabric according to the second embodiment is preferably 120000 to 200000, and more preferably 130000 to 190000.

As shown in FIG. 1, the aforementioned melt-blown nonwoven fabric producing apparatus 1 includes: an extruder 3, which melts the raw material composition to obtain the molten product; a hopper 2, which feeds the raw material composition to the extruder 3; a kneader 6, which kneads the molten product to obtain the molten product in a kneaded state (which may be hereinafter referred to as "molten kneaded product"); a nozzle 7, which discharges the molten kneaded product in a fibrous form; a collector 8, which collects and cools the fibrous molten kneaded product to obtain a melt-blown nonwoven fabric B; and a winder 9, which winds the melt-blown nonwoven fabric B.

The melt-blown nonwoven fabric producing apparatus 1 may; as necessary, further include a gear pump 4, which feeds the molten product to the kneader 6.

As a result of the melt-blown nonwoven fabric producing apparatus 1 including the gear pump 4, the amount of the molten product fed to the kneader 6 can be suppressed from varying.

The melt-blown nonwoven fabric producing apparatus 1 may, as necessary, further include a filter 5, which removes extraneous matter from the molten product at a position upstream of the kneader 6.

In the step (A), the raw material composition is fed via the hopper 2 to the extruder 3, which melts the raw material composition, and thereby the molten product is obtained.

The raw material composition fed to the extruder 3 is preferably solid, and more preferably in the form of pellets.

Preferably, before being fed to the extruder 3, the raw material composition has been heated and dried in light of suppressing hydrolysis of the resin of the raw material composition and suppressing oxidation degradation of the resin of the raw material composition.

The amount of water in the raw material composition fed to the extruder 3 is preferably less than or equal to 200 ppmw.

At the time of drying the raw material composition, preferably, oxygen is removed from the atmosphere and from the raw material composition. At the time of the drying, the atmosphere is preferably an inert gas (e.g., nitrogen gas) atmosphere.

In the step (A), the drying of the raw material composition may be performed before the raw material composition is fed to the hopper 2. Alternatively, the hopper 2 may be a hopper dryer, and the drying of the raw material composition may be performed by the hopper 2.

The raw material composition contains a polymer component. The raw material composition may further contain an additive.

Examples of the polymer component contained in the raw material composition include those polymer components listed above as examples of the polymer component contained in the resin composition.

Examples of the additive contained in the raw material composition include those additives listed above as examples of the additive contained in the resin composition.

The raw material composition preferably contains a crystal nucleating agent.

The raw material composition contains the crystal nucleating agent in an amount of preferably 0.1 parts by mass or more, more preferably 0.3 parts by mass or more, and even more preferably 0.5 parts by mass or more, with respect to 100 parts by mass of the poly(3-hydroxyalkanoate)-based resin.

Also, the raw material composition contains the crystal nucleating agent in an amount of preferably 2.5 parts by mass or less, more preferably 0.3 parts by mass or more, and even more preferably 0.5 parts by mass or more, with respect to 100 parts by mass of the poly(3-hydroxyalkanoate)-based resin.

Since the raw material composition contains the crystal nucleating agent in an amount of 0.1 to 2.5 parts by mass with respect to 100 parts by mass of the poly(3-hydroxyalkanoate)-based resin, it is easier for the molten product to have suitable flow characteristics, which is advantageous.

Examples of the extruder 3 include a single screw extruder, a co-rotating intermeshing twin screw extruder, a co-rotating non-intermeshing twin screw extruder, a counter-rotating non-intermeshing twin screw extruder, and a multiple screw extruder.

The extruder 3 is preferably a single screw extruder for the following reasons: in the case of a single screw extruder, thermal degradation of the resin during the extrusion can be readily suppressed since less resin stagnation occurs in a single screw extruder; and also, the equipment cost of a single screw extruder is less than that of the other types of extruders.

In the step (A), the molten product is fed via the filter 5 to the kneader 6 by the gear pump 4, and the molten product is kneaded by the kneader 6 to obtain the molten kneaded product.

The filter 5 is, for example, a screen mesh, a pleats filter, or a leaf disc filter.

The filter 5 is preferably a leaf disc filter in light of filtration accuracy, filtration area, and pressure resistance performance as well as for the reason that clogging due to extraneous matter is less likely to occur in the case of a leaf disc filter.

For example, a metal fiber sintered nonwoven fabric may be used as a filtering medium of the filter 5.

In the step (B), the molten kneaded product as the molten product is discharged in a fibrous form from the nozzle 7.

The nozzle 7 is a spinning die head.

The nozzle 7 includes a plurality of nozzle holes 7*a*, each of which discharges the molten kneaded product in a fibrous form. As shown in FIG. 2, the nozzle 7 discharges a plurality of fibrous molten kneaded products A.

The plurality of nozzle holes 7*a* are open downward.

The shape of the opening of each nozzle hole 7*a* is, for example, a circular shape (a concept encompassing a circle shape, an approximately circle shape, an ellipse shape, and an approximately ellipse shape).

The diameter of the opening is suitably selected in accordance with the fiber diameter of each fiber in the melt-blown nonwoven fabric.

The diameter of the opening is preferably greater than or equal to 0.05 mm, more preferably greater than or equal to 0.10 mm, and even more preferably greater than or equal to 0.15 mm.

Also, the diameter of the opening is preferably less than or equal to 1.0 mm, more preferably less than or equal to 0.50 mm, and even more preferably less than or equal to 0.30 mm.

The plurality of nozzle holes 7*a* of the nozzle 7 are spaced apart from each other and arranged in a line.

The distance between the nozzle holes 7*a* that are adjacent to each other (hereinafter, this distance is also referred to as "space") is, for example, preferably greater than or equal to 0.05 mm, more preferably greater than or equal to 0.1 mm, and even more preferably greater than or equal to 0.25 mm.

Since the distance (space) between the nozzle holes 7*a* that are adjacent to each other is greater than or equal to 0.05 mm, the fibers that are adjacent to each other can be suppressed from being fused to each other. This consequently makes it possible to reduce the coefficient of variation of the fiber diameter of the fibers.

Also, the distance (space) between the nozzle holes 7*a* that are adjacent to each other is, for example, preferably less than or equal to 1.0 mm, more preferably less than or equal to 0.7 mm, and even more preferably less than or equal to 0.5 mm.

The distances between the nozzle holes 7*a* that are adjacent to each other may be either equal to each other or unequal to each other. However, preferably, the distances between the nozzle holes 7*a* that are adjacent to each other are equal to each other, because, in this case, a melt-blown nonwoven fabric having uniform quality can be readily produced.

The collector 8 includes a collecting surface to collect the fibrous kneaded products A.

The collector 8 is a conveyor.

The conveyor includes: a conveyor belt 8*a* including the collecting surface; and a plurality of rollers 8*b* to drive the conveyor belt 8*a*.

The collecting surface is positioned immediately below the nozzle holes 7*a*.

The conveyor belt 8*a* has air permeability. Specifically, the conveyor belt 8*a* is formed from a net-like material. That is, the collecting surface is a net-like surface.

It should be noted that the collector 8 may be configured differently, so long as the collector 8 includes a collecting unit. For example, the collector 8 may include a collecting drum or a collecting net instead of the conveyor.

The distance between the collecting surface and the nozzle holes 7*a* (this distance is hereinafter also referred to as "DCD") is preferably greater than or equal to 20 mm, more preferably greater than or equal to 50 mm, and even more preferably greater than or equal to 80 mm.

Also, the distance (DCD) between the conveyor belt 8*a* as the collecting unit and the nozzle holes 7*a* is preferably less than or equal to 250 mm.

As shown FIG. 3, the melt-blown nonwoven fabric producing apparatus 1 is configured to apply high-temperature gas C to the fibrous molten kneaded products A to draw the fibrous molten kneaded products A.

In the step (B), the high-temperature gas C is applied to the fibrous molten kneaded products A, and the high-temperature gas C that has been applied to the molten kneaded products A is passed through the net-like conveyor belt 8*a*.

In the step (B), to facilitate the passing of the high-temperature gas C that has been applied to the molten kneaded products A through the net-like conveyor belt 8*a*, the high-temperature gas C is preferably sucked by a suction device (not shown). This makes it possible to prevent the fibers from rebounding on the collecting surface of the net-like conveyor belt 8*a*. Consequently, the melt-blown nonwoven fabric B in which the fibers are favorably fused to each other can be readily formed.

Further, in the step (B), the fibrous molten kneaded products A that have been drawn are collected by the conveyor belt 8*a*, then cooled while being transported by the conveyor belt 8*a*, and thereby the melt-blown nonwoven fabric is obtained.

The material that forms the net-like collecting surface is not particularly limited, so long as the material has thermal resistance against the temperature conditions in the production of the melt-blown nonwoven fabric B, will not be excessively fused to the melt-blown nonwoven fabric B, and allows the melt-blown nonwoven fabric B to be detached from the material.

The gas C is, for example, air or inert gas (e.g., nitrogen gas).

Examples of a method of applying the high-temperature gas C include a method in which the gas C that has been pressurized by a compressor (not shown) is heated by a heater (not shown).

The flow rate of the high-temperature gas C applied to the fibrous molten kneaded products (fibrous molten products) A is preferably greater than or equal to 5000 NL/min/m, more preferably greater than or equal to 5500 NL/min/m, and even more preferably less than or equal to 11000 NL/min/m.

Also, the flow rate of the high-temperature gas C applied to the fibrous molten kneaded products A is preferably less than or equal to 12000 NL/min/m, and more preferably less than or equal to 10000 NL/min/m.

Since the flow rate of the gas C is set to 5000 to 12000 NL/min/m, the melt-blown nonwoven fabric can be readily obtained, which is advantageous.

It should be noted that the flow rate (in units of NL/min/m) of the gas C is a value obtained by unit conversion, that is, a value obtained by dividing the total flow rate (in units of NL/min) of the gas C by the length (width) of the nozzle 7 in the CD direction. The length (width) of the nozzle 7 in the CD direction means the length (width) (mm) of the gas C in the CD direction.

In the step (B), the temperature and flow rate of the high-temperature gas C are suitably controlled to obtain the melt-blown nonwoven fabric with high crystallization.

A moving speed at which the melt-blown nonwoven fabric B is moved on the conveyor belt 8*a* (i.e., the moving speed of the conveyor belt 8*a*) is suitably set in consideration of the apparent density of the obtained melt-blown nonwoven fabric B while taking into account the discharge amount of the resin.

The moving speed is preferably within the range of greater than or equal to 1.0 m/min and less than or equal to 6.0 m/min.

In the step (B), the melt-blown nonwoven fabric B is transported to the winder 9 by the conveyor belt 8*a*, and the melt-blown nonwoven fabric B is wound into a roll by the winder 9.

DISCLOSURE ITEMS

The following items each disclose a preferred embodiment.

Item 1

A melt-blown nonwoven fabric including fibers, wherein: the fibers are formed from a resin composition that contains a poly(3-hydroxyalkanoate)-based resin; a melt mass-flow rate of the resin composition at 160° C. is 90 to 700 g/10 min, and/or a weight-average molecular weight of the resin composition is 120000 to 200000; an areal weight of the melt-blown nonwoven fabric is 20 to 80 g/m$^2$; an average value of a fiber diameter of the fibers is 1.7 to 3.0 μm; and a coefficient of variation of the fiber diameter of the fibers is less than or equal to 0.36.

Item 2

The melt-blown nonwoven fabric according to item 1, wherein the poly(3-hydroxyalkanoate)-based resin includes a homopolymer and/or a copolymer, and includes 80% by mole or more of 3-hydroxybutyrate as a structural unit.

Item 3

The melt-blown nonwoven fabric according to item 1 or 2, wherein the resin composition further contains a crystal nucleating agent in an amount of 0.1 to 2.5 parts by weight with respect to 100 parts by weight of the poly(3-hydroxyalkanoate)-based resin.

Item 4

The melt-blown nonwoven fabric according to any one of items 1 to 3, wherein a thickness of the melt-blown nonwoven fabric is 0.18 to 0.33 mm.

Item 5

A layered body including: a first nonwoven fabric; and a second nonwoven fabric layered over at least one surface of the first nonwoven fabric, wherein the first nonwoven fabric is the melt-blown nonwoven fabric according to any one of items 1 to 4, and the second nonwoven fabric is a nonwoven fabric including cellulosic fibers.

Item 6

A filter for a face mask, the filter being formed from the melt-blown nonwoven fabric according to any one of items 1 to 4 or from the layered body according to item 5.

Item 7

A face mask including: a mask body; and the filter for a face mask according to item 6.

Item 8

A method of producing a melt-blown nonwoven fabric from a raw material composition that contains a poly(3-hydroxyalkanoate)-based resin, the method including: (A) obtaining a molten product by heat-melting the raw material composition; and (B) obtaining the melt-blown nonwoven fabric from the molten product, wherein a melt mass-flow rate of the raw material composition at 160° C. is 90 to 700 g/10 min, and/or a weight-average molecular weight of the raw material composition is 120000 to 200000.

Item 9

The method of producing a melt-blown nonwoven fabric according to item 8, wherein the raw material composition further contains a crystal nucleating agent in an amount of 0.1 to 2.5 parts by weight with respect to 100 parts by weight of the poly(3-hydroxyalkanoate)-based resin.

Item 10

The method of producing a melt-blown nonwoven fabric according to item 8 or 9, wherein the step (B) includes: discharging the molten product from a nozzle in a fibrous form; and applying gas to the fibrous molten product at 5000 to 12000 NL/min/m.

It should be noted that the present invention is not limited to the above-described embodiments. Also, the present invention is not limited by the above-described functional advantages. Further, various modifications can be made to the present invention without departing from the scope of the present invention.

EXAMPLES

Next, the present invention is described more specifically with Examples and Comparative Examples. It should be noted that the present invention is not limited by these Examples in any way.

<P3HB3HH-0>

Culture production of P3HB3HH as the poly(3-hydroxyalkanoate)-based resin (hereinafter, also referred to as "P3HA-based resin") was performed by using KNK-005 strain (see U.S. Pat. No. 7,384,766).

First, a glycerol stock (50 μL) of KNK-005 strain containing cells was inoculated into a seed medium (10 mL).

Then, the cells were cultured for 24 hours (seed culturing). As a result of the seed culturing, a seed culture solution was obtained.

It should be noted that the composition of the seed medium was: 1/v % Meat-extract, 1 w/v % Bacto-Tryptone, 0.2 w/v % Yeast-extract, 0.9 w/v % $Na_2HPO_4 \cdot 12H_2O$, and 0.15 w/v % $KH_2PO_4$ (pH 6.8).

Next, the resulting seed culture solution was inoculated into a preculture medium (1.8 L) (the amount of the seed culture solution/the amount of the preculture medium: 1.0 v/v %) in a jar fermenter (MDL-300, Volume: 3 L, available from B. E. MARUBISHI Co., Ltd.).

Then, the cells were cultured for 28 hours (preculturing). As a result of the preculturing, a preculture solution was obtained.

It should be noted that the preculturing was performed under the conditions indicated below.

Culturing temperature: 33° C.

Stirring speed: 500 rpm

Ventilation volume: 1.8 L/min pH: 6.7 to 6.8.

For pH control, a 14 wt % aqueous ammonium hydroxide solution was used.

The composition of the preculture medium was: 1.1 w/v % $Na_2HPO_4 \cdot 12H_2O$, 0.19 w/v % $KH_2PO_4$, 1.29 w/v % $(NH_4)_2SO_4$, 0.1 w/v % $MgSO_4 \cdot 7H_2O$, and 0.5 v/v % trace metal salt solution (prepared by dissolving, in 0.1 N hydrochloric acid, 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$). Palm oil as a carbon source was added to the preculture medium at 10 g/L.

Next, the resulting preculture solution was inoculated into a production medium (6 L) (the amount of the preculture solution/the amount of the production medium: 1.0 v/v %) in a jar fermenter (MDS-1000, Volume: 10 L, available from B. E. MARUBISHI Co., Ltd.).

Then, the cells were cultured for 64 hours (production culturing). As a result of the production culturing, a production culture solution was obtained.

It should be noted that the production culturing was performed under the conditions indicated below.

Culturing temperature: 28° C.

Stirring speed: 400 rpm

Ventilation volume: 6.0 L/min pH: 6.7 to 6.8

For pH control, a 14 wt % aqueous ammonium hydroxide solution was used.

The composition of the production medium was: 0.385 w/v % $Na_2HPO_4 \cdot 12H_2O$, 0.067 w/v % $KH_2PO_4$, 0.291 w/v % $(NH_4)_2SO_4$, 0.1 w/v % $MgSO_4 \cdot 7H_2O$, 0.5 v/v % trace metal salt solution (prepared by dissolving, in 0.1 N hydrochloric acid, 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$), and 0.05 w/v % BIOSPUREX200K (defoaming agent: available from Cognis Japan Ltd.). Palm oil as a carbon source was added to the production medium at 10 g/L.

Next, the cells were collected from the production culture solution by centrifugal separation. Then, the collected cells were washed with methanol, and the washed cells were lyophilized. In this manner, dry cells were obtained.

Subsequently, 100 mL of chloroform was added to 1 g of the dry cells, and the mixture of the dry cells and the chloroform was stirred at room temperature all day and night to dissolve P3HB3HH contained in the dry cells into the chloroform, and thereby a P3HB3HH solution containing the cell residue was obtained.

Thereafter, the cell residue was removed from the P3HB3HH solution by filtration.

Next, the chloroform in the P3HB3HH solution was evaporated by an evaporator until the total volume of the P3HB3HH solution, from which the cell residue had been removed, became 30 mL, and thereby a concentrate was obtained.

Then, 90 mL of hexane was gradually added to the concentrate, and the concentrate and hexane were gently stirred together to obtain a mixture, and the mixture was left stand for 1 hour to deposit P3HB3HH in the mixture.

The mixture was filtered to separate P3HB3HH therefrom, and then the separated P3HB3HH was vacuum-dried at 50° C. for 3 hours. In this manner, P3HB3HH-0 (also referred to as "P3HA-0") as the P3HA-based resin was obtained.

<P3HB3HH-1>

A highly accelerated stress test chamber (EHS-222MD available from ESPEC Corp.) was used to subject the P3HB3HH-0 (P3HA-0) to treatment under the condition of high temperature and high humidity (temperature: 120° C., humidity: 100%) for 5.5 hours, and thereby P3HB3HH-1 (also referred to as "P3HA-1") as the P3HA-based resin was obtained.

The content of 3-hydroxyhexanoate (3HH) as a structural unit in P3HA-1 was 5.5% by mole.

Also, the content of 3-hydroxybutyrate as a structural unit in P3HA-1 was 94.5% by mole.

<P3HB3HH-2>

Commercially available P3HB3HH (PHBH available from Kaneka Corporation, grade: X331N), which is a P3HA-based resin, was used as P3HB3HH-2 (also referred to as "P3HA-2").

The content of 3-hydroxyhexanoate (3HH) as a structural unit in P3HA-2 was 6.0% by mole.

Also, the content of 3-hydroxybutyrate as a structural unit in P3HA-2 was 94.0% by mole.

<P3HB3HH-3>

P3HB3HH-3 (also referred to as "P3HA-3") as the P3HA-based resin was obtained in the same manner as the above-described P3HA-1, except that the P3HB3HH-0 (P3HA-0) was subjected to the treatment under the condition of high temperature and high humidity for a different length of time that was 4.5 hours.

The content of 3-hydroxyhexanoate (3HH) as a structural unit in P3HA-3 was 5.7% by mole.

Also, the content of 3-hydroxybutyrate as a structural unit in P3HA-3 was 94.3% by mole.

<P3HB3HH-4>

P3HB3HH-4 (also referred to as "P3HA-4") as the P3HA-based resin was obtained in the same manner as the above-described P3HA-1, except that the P3HB3HH-0 (P3HA-0) was subjected to the treatment under the condition of high temperature and high humidity for a different length of time that was 12 hours.

The content of 3-hydroxyhexanoate (3HH) as a structural unit in P3HA-4 was 5.7% by mole.

Also, the content of 3-hydroxybutyrate as a structural unit in P3HA-4 was 94.3% by mole.

It should be noted that the content of 3-hydroxybutyrate as a structural unit in P3HB3HH, and the content of 3-hydroxyhexanoate (3HH) as a structural unit in P3HB3HH, were determined in a manner as described below.

First, 2 mL of a mixed solution of sulfuric acid and methanol (the volume of sulfuric acid:the volume of methanol=15:85) and 2 mL of chloroform were added to 20 mg of P3HB3HH. The resulting sample was placed in a container, and the container was sealed. The sample in the sealed container was heated at 100° C. for 140 minutes, and thereby a first reaction solution was obtained, the first reaction solution containing a methyl ester that was a P3HB3HH degradation product.

Then, the first reaction solution was cooled, and 1.5 g of sodium hydrogen carbonate was added to the cooled first reaction solution little by little for neutralization. The resulting mixture was left stand until generation of carbon dioxide stopped. In this manner, a second reaction solution was obtained.

Further, 4 mL of diisopropyl ether was added and mixed well with the second reaction solution, and then the resulting mixture was subjected to centrifugal separation. In this manner, a supernatant solution was obtained.

Then, the monomer unit composition of a polyester degradation product in the supernatant solution was analyzed by capillary gas chromatography under the conditions indicated below, and thereby the content of 3-hydroxyhexanoate (3HH) as a structural unit in P3HB3HH was determined.

Gas chromatograph: GC-17A available from Shimadzu Corporation

Capillary column: NEUTRA BOND-1 (column length: 25 m, column inner diameter: 0.25 mm, liquid film thickness: 0.4 μm) available from GL Sciences Inc.

Carrier gas: He

Column inlet pressure: 100 kPa

Sample amount: 1 μL

As the temperature condition, the temperature was raised from 100° C. to 200° C. at the rate of 8° C./min, and then raised from 200° C. to 290° C. at the rate of 30° C./min.

Then, based on the value of the content of 3-hydroxyhexanoate (3HH) as a structural unit in P3HB3HH, the content of 3-hydroxybutyrate as a structural unit in P3HB3HH was determined.

Examples and Comparative Examples

The above-described P3HA-1, P3HA-2, P3HA-3, and P3HA-4, the below-described BA as a lubricant, the below-described EA as a lubricant, and the below-described PETL as a crystal nucleating agent were mixed together with a blending ratio shown in Table 1 below, and thereby a raw material composition was obtained.

BA: Behenic acid amide (BNT-22H available from Nippon Fine Chemical Co., Ltd.)

EA: Erucic acid amide (NEUTRON-S available from Nippon Fine Chemical Co., Ltd.)

PETL: Pentaerythritol (Neulizer P available from Taisei-kayaku Co., Ltd.)

(Measurement of Physical Properties of the Raw Material Composition)

The melt mass-flow rate (MFR) at 160° C. and the weight-average molecular weight (Mw) of the raw material composition were measured.

The measurement values are shown in Table 1 below.

TABLE 1

| | Blending ratio in the raw material composition | | | | | | |
|---|---|---|---|---|---|---|---|
| | P3HA-based resin | | Lubricant | | Crystal nucleating agent | Physical properties of the raw material composition | |
| | Type | Amount (parts by weight) | Amount of BA (parts by weight) | Amount of EA (parts by weight) | Amount of PETL (parts by weight) | Mw ($\times 10^4$) | MFR at 160° C. (g/10 min) |
| Example 1 | P3HA-1 | 100 | 0.5 | 0.5 | 1.5 | 19.0 | 130 |
| Example 2 | P3HA-1 | 100 | 0.5 | 0.5 | 1.5 | | |
| Example 3 | P3HA-1 | 100 | 0.5 | 0.5 | 1.5 | | |
| Example 4 | P3HA-1 | 100 | 0.5 | 0.5 | 1.5 | | |
| Example 5 | P3HA-1 | 100 | 0.5 | 0.5 | 1.5 | | |

TABLE 1-continued

| | Blending ratio in the raw material composition | | | | | Physical properties of the raw material composition | |
|---|---|---|---|---|---|---|---|
| | P3HA-based resin | | Lubricant | | Crystal nucleating agent | | |
| | Type | Amount (parts by weight) | Amount of BA (parts by weight) | Amount of EA (parts by weight) | Amount of PETL (parts by weight) | Mw ($\times 10^4$) | MFR at 160° C. (g/10 min) |
| Example 6 | P3HA-1 | 100 | 0.5 | 0.5 | 1.5 | | |
| Example 7 | P3HA-1 | 100 | 0.5 | 0.5 | 1.5 | | |
| Example 8 | P3HA-1 | 100 | 0.5 | 0.5 | 1.5 | | |
| Example 9 | P3HA-1 | 100 | 0.5 | 0.5 | 1.5 | | |
| Comp. Ex 1 | P3HA-2 | 100 | 0.5 | 0.5 | 1.0 | 40.0 | 11 |
| Comp. Ex 2 | P3HA-2 | 100 | 0.5 | 0.5 | 1.0 | | |
| Comp. Ex 3 | P3HA-3 | 100 | 0.5 | 0.5 | 1.0 | 21.6 | 74 |
| Comp. Ex 4 | P3HA-4 | 100 | — | — | 1.0 | 11.1 | 813 |
| Comp. Ex 5 | P3HA-4 | 100 | — | — | 1.0 | | |
| Comp. Ex 6 | P3HA-4 | 100 | — | — | 1.0 | | |
| Comp. Ex 7 | P3HA-4 | 100 | — | — | 1.0 | | |
| Comp. Ex 8 | P3HA-4 | 100 | — | — | 1.0 | | |
| Comp. Ex 9 | P3HA-4 | 100 | — | — | 1.0 | | |

With use of the melt-blown nonwoven fabric producing apparatus shown in FIGS. 1 to 3, a melt-blown nonwoven fabric of each Example and that of each Comparative Example were produced from the raw material composition under the conditions shown in Table 2 below.

TABLE 2

| | Extruder | Gear pump Rotation | Nozzle | | | Gas (air) applied to fibrous molten kneaded product | | | | Conveyor belt |
|---|---|---|---|---|---|---|---|---|---|---|
| | | | Nozzle hole | Number of nozzle holes | | | | | | |
| | Temperature ° C. | speed rpm | diameter mm | Number of holes | Space mm | Pressure MPa | Flow rate NL/min/m | Temperature ° C. | DCD mm | Moving speed m/min |
| Example 1 | 172 | 15 | 0.15 | 1207 | 0.20 | 0.16 | 9500 | 187 | 140 | 1.3 |
| Example 2 | 165 | 15 | 0.15 | 1207 | 0.20 | 0.18 | 10233 | 177 | 100 | 1.1 |
| Example 3 | 172 | 15 | 0.15 | 1207 | 0.35 | 0.16 | 9333 | 187 | 100 | 1.3 |
| Example 4 | 165 | 15 | 0.15 | 1207 | 0.35 | 0.18 | 10233 | 177 | 100 | 1.3 |
| Example 5 | 172 | 15 | 0.15 | 1207 | 0.35 | 0.18 | 10233 | 187 | 140 | 2.5 |
| Example 6 | 172 | 10 | 0.15 | 1207 | 0.35 | 0.14 | 8667 | 187 | 150 | 1.7 |
| Example 7 | 165 | 15 | 0.15 | 1207 | 0.35 | 0.18 | 10233 | 177 | 100 | 2.6 |
| Example 8 | 165 | 10 | 0.15 | 1207 | 0.35 | 0.18 | 10233 | 177 | 100 | 1.7 |
| Example 9 | 165 | 15 | 0.15 | 1207 | 0.35 | 0.18 | 10233 | 177 | 100 | 2.6 |
| Comp. Ex 1 | 182 | 15 | 0.25 | 1207 | 0.20 | 0.16 | 10667 | 200 | 250 | 2.4 |
| Comp. Ex 2 | 177 | 15 | 0.25 | 1207 | 0.20 | 0.16 | 10233 | 200 | 250 | 2.4 |
| Comp. Ex 3 | 165 | 15 | 0.25 | 1207 | 0.20 | 0.16 | 10233 | 180 | 250 | 2.6 |
| Comp. Ex 4 | 165 | 15 | 0.15 | 1207 | 0.35 | 0.16 | 10233 | 180 | 140 | 2.6 |
| Comp. Ex 5 | 165 | 15 | 0.15 | 1207 | 0.35 | 0.16 | 10233 | 180 | 140 | 3.1 |
| Comp. Ex 6 | 165 | 10 | 0.15 | 1207 | 0.35 | 0.16 | 10233 | 180 | 140 | 1.9 |
| Comp. Ex 7 | 165 | 10 | 0.15 | 1207 | 0.35 | 0.16 | 10233 | 180 | 140 | 2.3 |
| Comp. Ex 8 | 165 | 15 | 0.15 | 1207 | 0.20 | 0.16 | 10233 | 180 | 140 | 2.6 |
| Comp. Ex 9 | 165 | 10 | 0.15 | 1207 | 0.20 | 0.16 | 10233 | 180 | 140 | 1.4 |

(Measurement of Physical Properties of the Melt-Blown Nonwoven Fabric)

For each melt-blown nonwoven fabric, the areal weight, the thickness, the average value of the fiber diameter of the fibers, the coefficient of variation of the fiber diameter of the fibers, the average pore diameter, the weight-average molecular weight (Mw) of the resin composition, and the melt mass-flow rate (MFR) of the resin composition at 160° C. were measured.

The measurement values are shown in Tables 3 and 4 below.

(Maximum Load (Strength) and Stretchability of the Melt-Blown Nonwoven Fabric in the CD Direction and the MD Direction)

For each melt-blown nonwoven fabric, the maximum load and the stretchability in the CD direction and the MD direction were measured.

It should be noted that the maximum load and the stretchability in the CD direction and the MD direction were measured by using a constant rate extension type tensile test machine that accords with JIS B7721:2018 "Tension/compression testing machines-Calibration and verification of the force-measuring system".

It should be noted that, as the constant rate extension type tensile test machine, a universal tester (RTG-1210 available from A&D Company, Limited) or the like was used.

First, a test piece (width: 8 mm, length: 40 mm) was cut out from the melt-blown nonwoven fabric.

Next, the test piece with an initial load applied thereto was attached to the tensile test machine, i.e., gripped by grips of the tensile test machine, with the length of the test piece between the grips being 20 mm.

Here, the initial load was applied to the test piece by pulling the test piece by hand to such an extent that sagging did not occur.

Then, a load was applied to the test piece at a tensile speed of 20 mm/min until the test piece broke, and the maximum load and the stretchability of the test piece in the CD direction and the MD direction were measured.

(Viral Filtration Efficiency of the Melt-Blown Nonwoven Fabric)

For each melt-blown nonwoven fabric, viral filtration efficiency (VFE) was measured. The viral filtration efficiency was measured in accordance with JIS T9001:2021 "Performance requirements and test methods of medical face masks and non-medical face masks". The viral filtration efficiency means efficiency in filtering out viruses attached to particles.

(Pressure Drop Caused by the Melt-Blown Nonwoven Fabric)

A pressure drop caused by each melt-blown nonwoven fabric was measured.

The pressure drop was measured in accordance with JIS T9001:2021 "Performance requirements and test methods of medical face masks and non-medical face masks".

It should be noted that the measurement of the viral filtration efficiency and the pressure drop was performed not only on one piece of the melt-blown nonwoven fabric, but also on two pieces of the melt-blown nonwoven fabric layered together.

The measurement results are shown in Tables 3 and 4 below.

TABLE 3

| | Physical properties of the melt-blown nonwoven fabric | | | | | | | Evaluation test | | | | | | | |
|---|---|---|---|---|---|---|---|---|---|---|---|---|---|---|---|
| | | | Fiber diameter of fibers | | Average | Resin composition | | | | | | One piece of nonwoven fabric | | Two layered pieces of nonwoven fabric | |
| | Areal weight g/m² | Thickness mm | Average value µm | Coefficient of variation — | pore diameter µm | Mw ×10⁴ | MFR at 160° C. g/10 min | Maximum load CD N | Maximum load MD N | Stretchability CD % | Stretchability MD % | VFE % | Pressure drop Pa/cm² | VFE % | Pressure drop Pa/cm² |
| Example 5 | 31 | 0.18 | 2.1 | 0.36 | 8.2 | 13.9 | 407 | 1.0 | 2.3 | 34.2 | 16.2 | 88.8 | 39.0 | 96.8 | 79.4 |
| Example 6 | 31 | 0.18 | 1.7 | 0.33 | 8.2 | 14.0 | 649 | 1.0 | 2.2 | 42.1 | 21.1 | 92.5 | 46.0 | 98.1 | 90.2 |
| Example 7 | 32 | 0.21 | 2.9 | 0.23 | 9.7 | 15.4 | 287 | 1.1 | 2.5 | 45.3 | 31.7 | 86.2 | 29.4 | 96.0 | 63.8 |
| Example 8 | 32 | 0.22 | 2.2 | 0.24 | 8.5 | 14.5 | 310 | 0.8 | 2.0 | 32.4 | 25.2 | 96.0 | 51.8 | 99.1 | 113.8 |
| Example 9 | 32 | 0.21 | 2.8 | 0.22 | 9.9 | 15.7 | 243 | 1.1 | 2.5 | 49.4 | 29.4 | 95.6 | 54.6 | 98.9 | 110.0 |
| Comp. Ex 1 | 30 | 0.19 | 1.8 | 0.40 | 10.4 | 14.8 | 315 | 1.1 | 1.9 | 27.1 | 9.6 | 84.4 | 25.3 | 94.9 | 50.5 |
| Comp. Ex 2 | 29 | 0.19 | 2.6 | 0.39 | 14.3 | 17.1 | 209 | 1.1 | 2.0 | 39.5 | 14.4 | 78.9 | 18.3 | 91.1 | 36.6 |
| Comp. Ex 3 | 32 | 0.17 | 2.7 | 0.41 | 17.0 | 19.1 | 176 | 1.2 | 2.5 | 42.9 | 26.5 | 63.8 | 12.3 | 88.3 | 22.1 |
| Comp. Ex 4 | 31 | 0.19 | 2.0 | 0.31 | 8.3 | 10.0 | 1000 or greater | 0.6 | 1.6 | 3.2 | 2.5 | 84.6 | 39.4 | 96.8 | 88.6 |
| Comp. Ex 5 | 25 | 0.16 | 1.7 | 0.34 | 8.6 | 10.5 | 1000 or greater | 0.4 | 1.1 | 2.3 | 2.9 | 83.8 | 32.0 | 93.5 | 64.8 |
| Comp. Ex 6 | 29 | 0.19 | 1.4 | 0.43 | 5.6 | 9.8 | 2660 | 0.5 | 1.7 | 2.5 | 2.3 | 96.1 | 61.8 | 99.1 | 119.6 |
| Comp. Ex 7 | 24 | 0.16 | 1.5 | 0.37 | 6.1 | 9.7 | 1000 or greater | 0.3 | 1.3 | 2.2 | 2.4 | 95.3 | 46.2 | 98.5 | 92.8 |
| Comp. Ex 8 | 40 | 0.20 | 1.6 | 0.38 | 7.6 | 10.1 | 1424 | 1.0 | 2.6 | 3.2 | 2.4 | 89.9 | 68.2 | — | — |
| Comp. Ex 9 | 39 | 0.19 | 1.7 | 0.39 | 4.8 | 9.7 | 1000 or greater | 0.5 | 1.9 | 2.8 | 2.2 | 97.1 | 69.4 | — | — |

TABLE 4

| | Physical properties of the melt-blown nonwoven fabric | | | | | | | Evaluation test | | | | | | | |
|---|---|---|---|---|---|---|---|---|---|---|---|---|---|---|---|
| | | | Fiber diameter of fibers | | | Resin composition | | | | | | One piece of nonwoven fabric | | Two layered pieces of nonwoven fabric | |
| | Areal weight g/m² | Thickness mm | Average value µm | Coefficient of variation — | Average pore diameter µm | Mw ×10⁴ | MFR at 160° C. g/10 min | Maximum load CD N | Maximum load MD N | Stretchability CD % | Stretchability MD % | VFE % | Pressure drop Pa/cm² | VFE % | Pressure drop Pa/cm² |
| Example 1 | 61 | 0.27 | 2.1 | 0.26 | 5.4 | 14.5 | 430 | 2.2 | 5.0 | 48.6 | 9.4 | 95.8 | 78.0 | — | — |
| Example 2 | 74 | 0.31 | 2.4 | 0.18 | 5.5 | 15.6 | 251 | 2.7 | 6.5 | 52.5 | 31.8 | 96.9 | 95.2 | — | — |
| Example 3 | 62 | 0.28 | 2.1 | 0.17 | 4.8 | 13.9 | 375 | 2.1 | 4.5 | 35.6 | 23.4 | 95.4 | 98.8 | — | — |
| Example 4 | 63 | 0.29 | 2.6 | 0.15 | 5.2 | 15.5 | 263 | 2.3 | 5.3 | 58.4 | 27.0 | 96.0 | 78.2 | — | — |

As shown in Table 3, in Examples 5 to 9, which fall within the scope of the present invention, the maximum load and the stretchability measured in a test using the Tensilon universal tester were higher than those in Comparative Examples 4 to 9, in which the weight-average molecular weight (Mw) of the resin composition was less than or equal to $10.5\times10^4$, and also the melt mass-flow rate (MFR) of the resin composition at 160° C. was greater than or equal to 1000 g/10 min.

Further, as shown in Table 3, in Examples 5 to 9, which fall within the scope of the present invention, the viral filtration efficiency (VFE) was higher than that in Comparative Examples 1 to 3, in which the areal weight was about the same as that in Examples 5 to 9.

Still further, as shown in Table 4, in Examples 1 to 4, which fall within the scope of the present invention, the viral filtration efficiency (VFE) was high.

Therefore, the present invention makes it possible to provide a melt-blown nonwoven fabric with high strength, high stretchability, and high particle filtration efficiency.

REFERENCE SIGNS LIST

1: melt-blown nonwoven fabric producing apparatus, 2: hopper, 3: extruder, 4: gear pump, 5: filter, 6: kneader, 7: nozzle, 7*a*: nozzle hole, 8: collector, 8*a*: conveyor belt, 8*b*: roller, 9: winder, A: kneaded product, B: melt-blown nonwoven fabric, C: gas

The invention claimed is:

1. A melt-blown nonwoven fabric comprising fibers, wherein:

the fibers are formed from a resin composition comprising a poly(3-hydroxyalkanoate)-based resin;

a melt mass-flow rate of the resin composition at 160° C. is from 90 to 700 g/10 min, and/or a weight-average molecular weight of the resin composition is from 120000 to 200000;

an areal weight of the melt-blown nonwoven fabric is from 20 to 80 g/m$^2$;

an average value of a fiber diameter of the fibers is from 1.7 to 3.0 μm; and a coefficient of variation of the fiber diameter of the fibers is 0.36 or less.

2. The melt-blown nonwoven fabric according to claim 1, wherein the poly(3-hydroxyalkanoate)-based resin includes comprises a homopolymer, a copolymer, or a combination thereof, and comprises at least 80% by mole of 3-hydroxybutyrate as a structural unit.

3. The melt-blown nonwoven fabric according to claim 1, wherein the resin composition further comprises a crystal nucleating agent in an amount of from 0.1 to 2.5 parts by weight with respect to 100 parts by weight of the poly(3-hydroxyalkanoate)-based resin.

4. The melt-blown nonwoven fabric according to claim 1, wherein a thickness of the melt-blown nonwoven fabric is from 0.18 mm to 0.33 mm.

5. A layered body comprising:

a first nonwoven fabric; and a second nonwoven fabric layered over at least one surface of the first nonwoven fabric, wherein the first nonwoven fabric is the melt-blown nonwoven fabric of claim 1, and the second nonwoven fabric is a nonwoven fabric comprising cellulosic fibers.

6. A filter for a face mask, wherein the filter is formed from the melt-blown nonwoven fabric of claim 1.

7. A face mask comprising:

a mask body; and the filter for a face mask of claim 6.

8. A method of producing the melt-blown nonwoven fabric of claim 1 from a raw material composition comprising a poly(3-hydroxyalkanoate)-based resin, the method comprising:

(A) obtaining a molten product by heat-melting the raw material composition; and (B) obtaining the melt-blown nonwoven fabric from the molten product, wherein a melt mass-flow rate of the raw material composition at 160° C. is from 90 to 700 g/10 min, a weight-average molecular weight of the raw material composition is from 120000 to 200000, or a combination thereof.

9. The method of producing a melt-blown nonwoven fabric according to claim 8, wherein the raw material composition further comprises a crystal nucleating agent in an amount of from 0.1 to 2.5 parts by weight with respect to 100 parts by weight of the poly(3-hydroxyalkanoate)-based resin.

10. The method of producing a melt-blown nonwoven fabric according to claim 8, wherein the (B) comprises:

discharging the molten product from a nozzle in a fibrous form; and applying gas to the fibrous molten product at 5000 to 12000 NL/min/m.

11. A filter for a face mask, wherein the filter is formed from the layered body of claim 5.

12. A face mask comprising:

a mask body; and the filter for a face mask of claim 11.

* * * * *